United States Patent [19]

Takezawa

[11] Patent Number: 5,477,516
[45] Date of Patent: Dec. 19, 1995

[54] REPRODUCING APPARATUS FOR ACCESSING TRACK SEGMENTS IN THE FORWARD AND REVERSE DIRECTIONS

[75] Inventor: Masayuki Takezawa, Tokyo, Japan

[73] Assignee: Sony Coporation, Tokyo, Japan

[21] Appl. No.: 406,776

[22] Filed: Mar. 17, 1995

Related U.S. Application Data

[63] Continuation of Ser. No. 62,564, May 17, 1993, abandoned.

[30] Foreign Application Priority Data

May 20, 1992 [JP] Japan ................................. 4-151131

[51] Int. Cl.⁶ ................................................. G11B 5/09
[52] U.S. Cl. ................................. 369/48; 369/32
[58] Field of Search ............................... 369/59, 48, 58, 369/54, 32, 47, 49

[56] References Cited

U.S. PATENT DOCUMENTS

| | | | |
|---|---|---|---|
| 4,613,967 | 9/1986 | Hamada et al. | 369/221 |
| 4,791,623 | 12/1988 | Deiotte | 369/59 |
| 5,153,861 | 10/1992 | Maeda et al. | 369/32 |
| 5,343,452 | 8/1994 | Maeda et al. | 369/32 |

FOREIGN PATENT DOCUMENTS

| | | | |
|---|---|---|---|
| 0064395 | 11/1982 | European Pat. Off. | G11B 7/08 |
| 0284037 | 9/1988 | European Pat. Off. | G11B 27/28 |
| 0281415 | 9/1988 | European Pat. Off. | G11B 27/32 |
| 0346979 | 12/1989 | European Pat. Off. | G11B 27/10 |
| 0406021A3 | 1/1991 | European Pat. Off. | G11B 19/04 |
| 0472343A1 | 2/1992 | European Pat. Off. | G11B 7/00 |
| 540164A1 | 9/1992 | European Pat. Off. | G11B 20/00 |
| 0510834A2 | 10/1992 | European Pat. Off. | G06F 15/419 |
| 0540164A1 | 5/1993 | European Pat. Off. | G11B 20/00 |
| 2281322 | 11/1990 | Japan | G06F 3/08 |

Primary Examiner—Georgia Y. Epps
Assistant Examiner—P. W. Huber
Attorney, Agent, or Firm—Limbach & Limbach

[57] ABSTRACT

A reproducing apparatus is disclosed in which reproduction advancement data are produced using data recorded in a user Table of Contents (TOC) area of a recording medium as access information during recording and/or reproduction of data. This allows ordinary and special reproducing operations to be performed in the forward and reverse directions readily. The reproduction advancement data are produced such that segment numbers are indicated in the order of numbers of programs to be reproduced or in the predetermined order of reproduction. During reproduction, a reproduction pointer is advanced or retreated along the reproduction advancement data to discriminate a segment so that the segments can be accessed successively in the forward or reverse reproducing directions.

5 Claims, 12 Drawing Sheets

| | 16 BIT | | 16 BIT | | |
|---|---|---|---|---|---|
| | MSB     LSB | MSB     LSB | MSB     LSB | MSB     LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | CLUSTER | CLUSTER | 00000000 | 00000000 | 3 |
| | 00000000 | 00000000 | 00000000 | 00000000 | 4 |
| | 00000000 | 00000000 | 00000000 | 00000000 | 5 |
| | | | | | 6 |
| | | | FIRST TNO | LAST TNO | 7 |
| | | | | USED SECTORS | 8 |
| | | | | | 9 |
| | | | | | 10 |
| | DISC | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| (01) | START ADDRESS | | | TRACK MODE | 78 |
| | END ADDRESS | | | LINK INFORMATION | 79 |
| (02) | START ADDRESS | | | TRACK MODE | 80 |
| | END ADDRESS | | | LINK INFORMATION | 81 |
| (03) | START ADDRESS | | | TRACK MODE | 82 |
| | END ADDRESS | | | LINK INFORMATION | 83 |
| (FC) | START ADDRESS | | | TRACK MODE | 500 |
| | END ADDRESS | | | LINK INFORMATION | 581 |
| (FD) | START ADDRESS | | | TRACK MODE | 582 |
| | END ADDRESS | | | LINK INFORMATION | 583 |
| (FE) | START ADDRESS | | | TRACK MODE | 584 |
| | END ADDRESS | | | LINK INFORMATION | 585 |
| (FF) | START ADDRESS | | | TRACK MODE | 586 |
| | END ADDRESS | | | LINK INFORMATION | 587 |

MANAGEMENT TABLES (255 PART TABLES)

| SEGMENT NUMBER | START ADDRESS | END ADDRESS |
|---|---|---|
| 02 | S(02) | E(02) |
| 03 | S(03) | E(03) |
| 1E | S(1E) | E(1E) |
| 40 | S(40) | E(40) |
| 31 | S(31) | E(31) |
| A0 | S(A0) | E(A0) |
|  |  |  |
|  |  |  |
|  |  |  |

FIG. 14

| SEGMENT NUMBER | START ADDRESS | END ADDRESS | PROGRAM NUMBER |
|---|---|---|---|
| 02 | S(02) | E(02) | 01 |
| 03 | S(03) | E(03) | 01 |
| 1E | S(1E) | E(1E) | 01 |
| 40 | S(40) | E(40) | 01 |
| 31 | S(31) | E(31) | 02 |
| A0 | S(A0) | E(A0) | 02 |
|  |  |  |  |
|  |  |  |  |
|  |  |  |  |

FIG. 15

REPRODUCING APPARATUS FOR ACCESSING TRACK SEGMENTS IN THE FORWARD AND REVERSE DIRECTIONS

This is a continuation of U.S. application Ser. No. 08/062,564 filed on May 17, 1993, now abandoned.

BACKGROUND OF THE INVENTION

1. Field of the Invention

This invention relates to a recording and/or reproducing apparatus which can record and/or reproduce data of a program onto or from, for example, a disk-shaped recording medium.

2. Description of the Related Art

Recordable disk media such as, for example, magneto-optical disks (MO disks) are more suitable to random accessing as compared with tape-shaped recording media such as digital audio tapes and compact cassette tapes. Various recording and/or reproducing apparatus for recording and/or reproducing such recordable disk media are already known, and an example of such a recording and/or reproducing apparatus is disclosed, for example, in U.S. patent application Ser. No. 717,700, filed Jun. 19, 1991, now U.S. Pat. No. 5,214,631, and assigned to the assignee of the present patent application. A recording and/or reproducing apparatus of the type mentioned need not necessarily record, for example, a program on a continuous segment of a recordable disk medium but may record it discretely on a plurality of segments on the disk (it is to be noted that the segment herein denotes a portion of a track in which data are recorded physically and continuously on a disk). In short, if a recording and/or reproducing operation within a segment and a high speed accessing operation are repeated, then even if a track of a program is physically divided into a plurality of segments, there is no trouble in recording and/or reproducing of the program.

Figure 15:
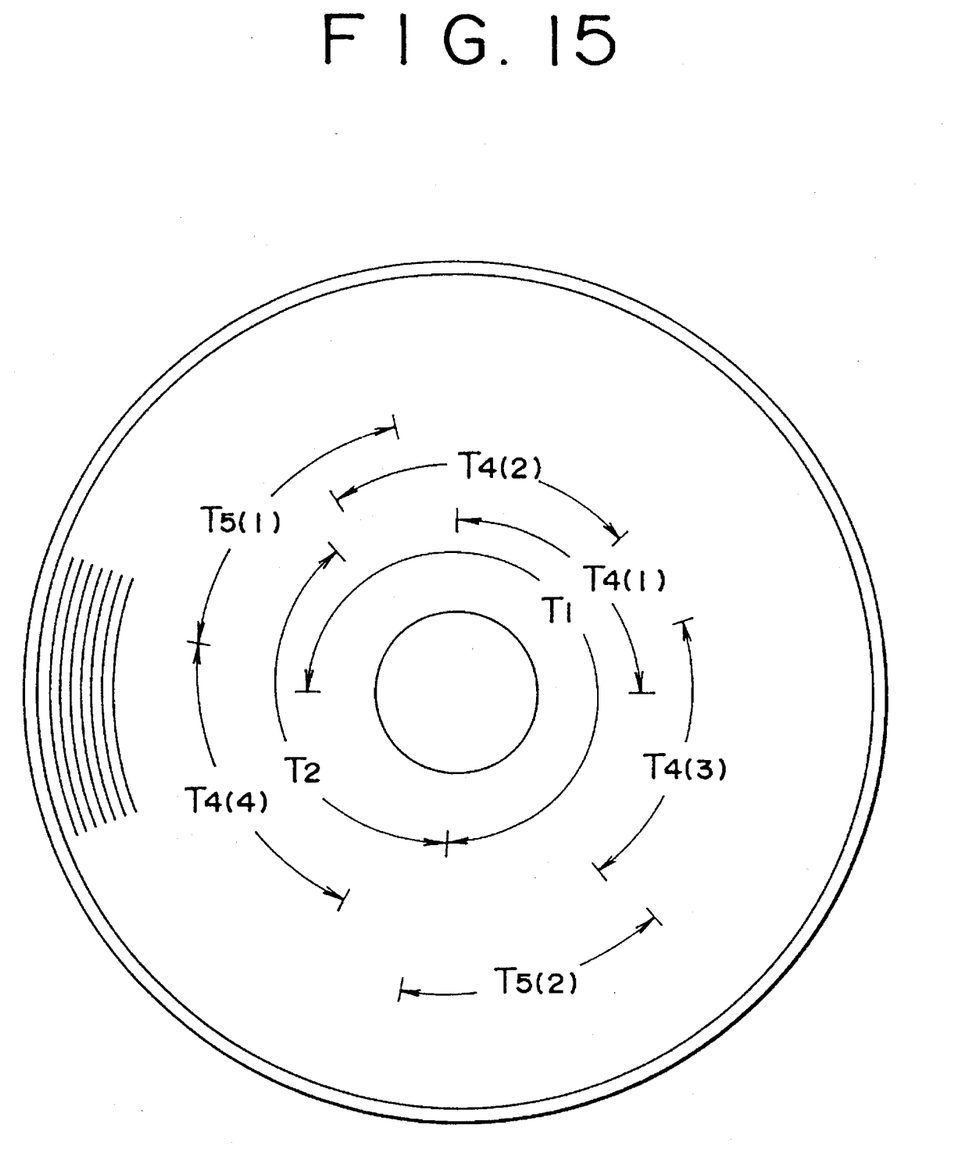
FIG. 15 is a diagrammatic view showing a disk medium on which a program can be recorded on discrete segments.

For example, referring to FIG. 15, data of a first program and data of a second program are recorded continuously on a segment $T_1$ and another segment $T_2$. However, it is also possible to record data of a program separately on discontinuous segments in such a manner that data of fourth and fifth programs are recorded divisionally on discontinuous segments $T_{4(1)}$ to $T_{4(4)}$ and $T_{5(1)}$ to $T_{5(2)}$, respectively, as shown in FIG. 15. It is to be noted that FIG. 15 shows the disk only in a schematic fashion, and actually, in most cases one segment extends over several to several hundreds tracks.

When recording or erasure of a program onto or from a magneto-optical disk is repeated, empty areas are produced irregularly on tracks of the disk due to a difference between playing times of recorded programs or between playing times of erased programs. However, if such discrete recording is performed, then it is possible to record, for example, a program longer than another program erased from the disk onto the disk by making use of the portion from which the program has been erased. Consequently, it can be prevented that a useless data recording area is produced by a repetition of recording and/or erasure. It is to be noted that recorded information is not always data of a program (musical piece) and may be any audio signal, and accordingly, in the present specification, a mass of data continuous in contents is represented as "program".

In a disk medium of the type described above, in order to allow random accessing, data for linking segments (for example, $T_{4(1)}$ to $T_{4(4)}$ in FIG. 15) of a program are stored as user TOC (Table of Contents) information which is re-written each time a recording operation or an erasing operation is performed. Thus, a recording and/or reproducing apparatus is controlled so as to read the user TOC information and perform accessing of a head to achieve an appropriate recording and/or recording operation. An of example signal recording and/or reproducing apparatus of the type just described is disclosed in U.S. patent application Ser. No. 945,488, filed Sep. 16, 1992 and assigned to the assignee of the present patent application.

Incidently, addresses of a start position and an end position which define the range of a segment as well as link information which designates a succeeding segment to which the former segment is to be linked are recorded normally as such user TOC data for linking segments. This way, if the link information is traced, then a segment to be accessed can be grasped by the system. Consequently, even if a program is recorded divisionally in a plurality of segments, an ordinary operation such as a recording operation or a reproducing operation can be performed.

However, information designating a preceding segment from a certain segment, that is, link information in the reverse direction, is not recorded on a disk medium. Consequently, it is impossible to trace back segments based on user TOC information. Accordingly, a disk medium is disadvantageous in that it is very difficult to perform reverse reproduction, fast reverse reproduction or the like.

SUMMARY OF THE INVENTION

It is an object of the present invention to provide a reproducing apparatus wherein reproduction advancement data are produced making use of data, which are recorded in a user TOC area of a record medium, as access information for use for recording and/or reproduction of data to readily allow an ordinary reproducing operation in the forward direction and a special reproducing operation in the reverse direction.

In order to attain the object described above, according to the present invention, there is provided a reproducing apparatus for reproducing a program from a recording medium which has recorded thereon, as segment management data which are used to reproduce unit program data each recorded on a single continuous segment or a plurality of discrete segments, for each of the recorded programs, management data including a plurality of part tables each having a start address and an end address of a segment and link information indicative of another part table in which a start address and an end address of another segment to be linked to the end address of the former segment are stored. Corresponding table indicating data indicating a stored position of one or a head one of a plurality of ones of the part tables of the management data for each of the recorded programs is also stored. The apparatus includes a data read-out means for reading out data from the recording medium, means for producing reproduction advancement data from the segment management data read out by the data read-out means, control means for controlling an ordinary reproducing operation or an irregular reproducing operation based on the reproduction advancement data, and storage means for storing the reproduction advancement data therein, the reproduction advancement data being produced such that segment numbers are indicated in order of reproduction so that the segments can be accessed successively in the forward or reverse reproducing direction.

Preferably, the reproduction advancement data are produced such that start addresses and end addresses of the segments are indicated in order of reproduction so that the segments can be accessed successively in the forward or reverse reproducing direction without referring to the segment management data.

Alternatively, the reproduction advancement data may be produced such that segment numbers and/or start addresses and end addresses of the segments are indicated in order of reproduction and the numbers of programs to which the segments belong are indicated so that the segments can be accessed successively in desired order of programs in the forward or reverse reproducing direction.

Preferably, the storage means stores the reproduction advancement data in a sequence table area thereof, and the control means reads out a segment number in response to a reproduction pointer, which moves on the sequence table stored in the storage means, and reproduces a program of a segment in accordance with the segment number thus read out. In this instance, preferably the sequence table is produced during the reproducing operation.

In the reproducing apparatus, since the position or positions of one or a plurality of segments on a recording medium which corresponds or correspond to each of the programs recorded on the recording medium are grasped as segment management data as the part tables having start addresses and end addresses are linked by the link information, the order of reproduction of segments can be grasped from the segment management data. Accordingly, reproduction advancement data which indicate the order of segments to be reproduced can be produced making use of the segment management data. Once the reproduction advancement data are produced, any segment preceding to and another segment subsequent to a certain segment in the forward direction can be detected by grasping the current reproducing position on the reproduction advancement data.

With the reproducing apparatus, upon reproduction, if a reproducing operation and a segment accessing operation are performed referring to the reproduction advancement data, then even if a program is constituted from discrete segments on the recording medium, accessing to the segments can be performed readily not only in the forward direction but also in the reverse direction, and accordingly, also review reproduction can be realized.

The reproducing apparatus is further advantageous in that advancement of programs to be reproduced can be grasped in various orders in accordance with contents of data stored as reproduction advancement data or with timings or methods of production of the reproduction advancement data, and queue and/or review reproduction can be performed in accordance with the order.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
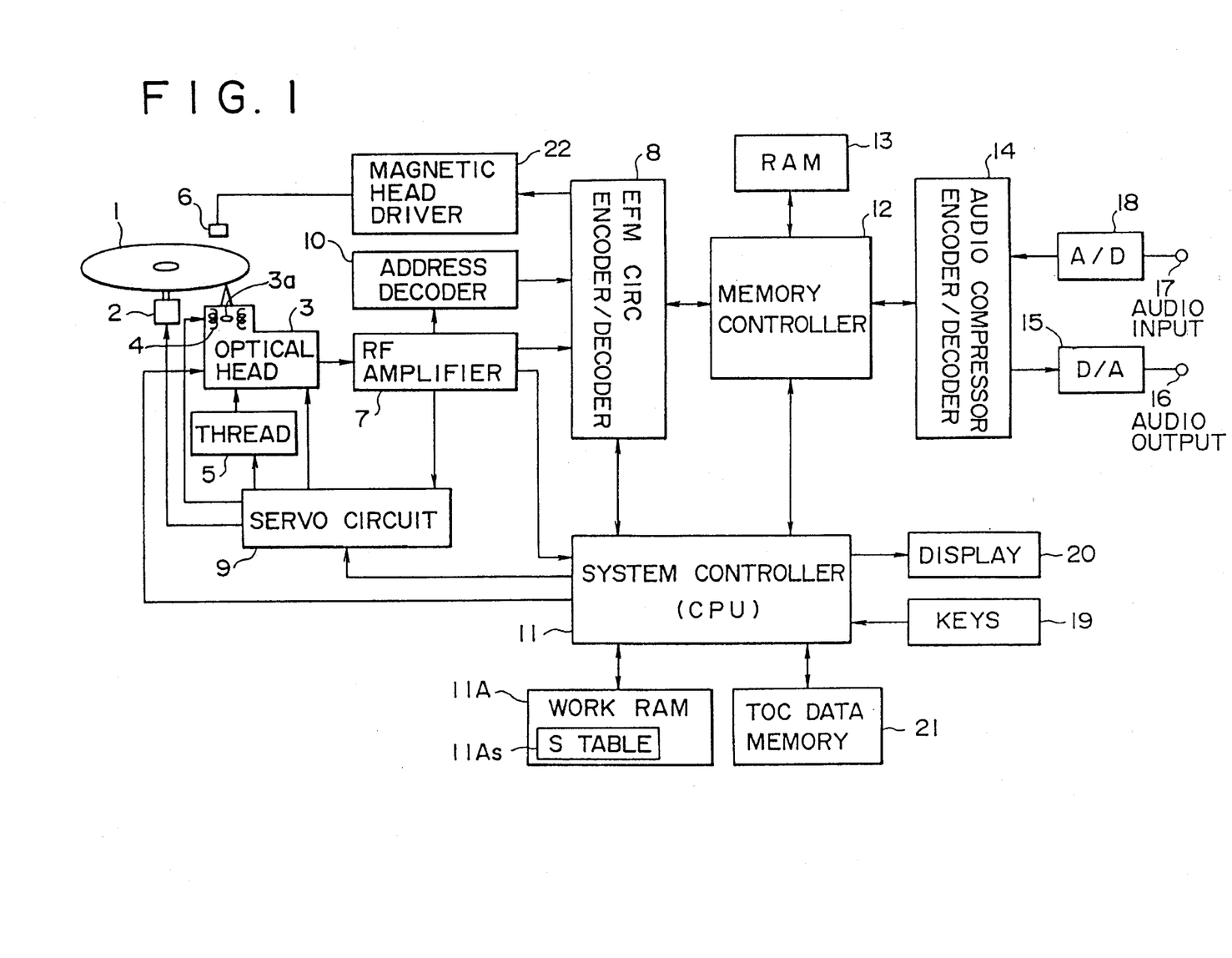
FIG. 1 is a block diagram of a recording and/or reproducing apparatus showing a preferred embodiment of the present invention.

Referring first to FIG. 1, there is shown a construction of a recording and reproducing apparatus to which the present invention is applied. The recording and reproducing apparatus shown employs a magneto-optical disk as a recording medium. The magneto-optical disk is generally denoted at 1 and has a plurality of programs (audio data) recorded thereon. The magneto-optical disk 1 is driven to rotate by a spindle motor 2. An optical head 3 irradiates a laser beam upon the magneto-optical disk 1 to perform recording or reproduction. In particular, upon recording, the optical head 3 outputs a laser beam of a high level to heat a recording track to a temperature higher than the Curie temperature of the magneto-optical disk 1, but upon reproduction, the optical head 3 outputs a laser beam of a comparatively low power level for detecting data from reflected light based on a magnetic Kerr effect.

To this end, though not shown, the optical head 3 carries thereon an optical system including a laser diode serving as laser outputting means, a polarizing beam splitter, an objective lens and some other optical elements, and a detector for detecting reflected light. The objective lens 3a is carried for displacement in a radial direction of the disk 1 and in a perpendicular direction toward and away from the disk 1 by a biaxial mechanism 4, and the entire optical head 3 is mounted for movement in a radial direction of the disk 1 by a thread mechanism 5.

A magnetic head 6 is disposed in an opposing relationship to the optical head 3 with the magneto-optical disk 1 interposed therebetween and applies a magnetic field modulated in accordance with data supplied thereto to the magneto-optical disk 1.

Upon reproducing operation, information detected from the magneto-optical disk 1 by the optical head 3 is supplied to an RF (radio frequency) amplifier 7. The RF amplifier 7 executes calculation processing of the information supplied thereto to extract a reproduction RF signal, a tracking error signal, a focusing error signal, absolute position information (information of an absolute position recorded as a pre-group (wobbling group) on the magneto-optical disk 1), address information, sub-code information, a focus monitor signal and so forth. The thus extracted reproduction RF signal is supplied to an encoder/decoder section 8. Meanwhile, the tracking error signal and the focusing error signal are supplied to a servo circuit 9, and the address information is supplied to an address decoder 10. Further, the absolute position information and the focusing monitor signal are supplied to a system controller 11 which may be constituted, for example, from a microcomputer.

The servo circuit 9 generates various servo driving signals in response to the tracking error signal and the focusing error signal supplied thereto from the RF amplifier 7 and also to a track jumping instruction, a seeking instruction, rotational speed detection information and so forth supplied thereto from the system controller 11 to control the biaxial mechanism 4 and the thread mechanism 5 to effect focusing and tracking control and to control the spindle motor 2 to rotate at a constant angular velocity (CAV) or a constant linear velocity (CLV).

The reproduction RF signal is processed by decoding processing such as EFM demodulation or CIRC by the encoder/decoder section 8, and then written once into a buffer RAM (random access memory) 13 by a memory controller 12. It is to be noted that reading of data from the magneto-optical disk 1 by the optical head 3 and transfer of reproduction data from the optical head 3 up to the buffer RAM 13 is performed at the rate of 1.41 Mbit/sec.

The data written in the buffer RAM 13 are read out at the reproduction data transfer rate of 0.3 Mbit/sec and supplied to the encoder/decoder section 14, at which they are subsequently processed by reproduction signal processing such as decoding processing against audio compressing processing. The data are then converted into an analog signal by a digital to analog (D/A) converter 15 and supplied from a terminal 16 to a predetermined amplifier circuit, from which it is outputted to the outside, for example, as L- and R-channel audio signals.

Meanwhile, the address information outputted from the address decoder 10 is supplied to the system controller 11 by way of the encoder/decoder section 8 so as to be used for various controlling operations.

Also, a locking detection signal of a PLL (phase locked loop) circuit for generating a bit clock signal for a recording and/or reproducing operation) and a monitor signal representative of a missing condition of a frame synchronizing signal of the reproduction data (L- and R-channels) are supplied to the system controller 11.

The system controller 11 includes a work RAM 11A for temporarily storing various calculation data therein. The work RAM 11A has an area 11As used for storing therein a sequence table (reproduction advancement data) which will be hereinafter described.

When a recording operation is to be performed onto the magneto-optical disk 1, a recording signal (analog audio signal) supplied to the terminal 17 is converted into digital data by an analog to digital (A/D) converter 18 and then supplied to the encoder/decoder section 14, at which audio compressing encoding processing is performed to them. The recording data compressed by the encoder/decoder section 14 are written once into the buffer RAM 13 by the memory controller 12 and then read out and sent at predetermined timings to the encoder/decoder section 8. Then, the recording data are processed by encoding processing such as encoding and/or EFM modulation at the encoder/decoder section 8 and then supplied to a magnetic head driving circuit 22.

The magnetic head driving circuit 22 supplies a magnetic head driving signal to the magnetic head 6 in response to the recording data to which the encoding processing has been applied. In short, a magnetic field of the north or south pole is applied from the magnetic head 6 to the magneto-optical disk 1. Meanwhile, the system controller 11 supplies a controlling signal to the optical head 3 so as to output laser light at the recording level.

The recording and reproducing apparatus further includes a manually operable inputting section 19 on which manually operable keys are provided, and a display section 20 constituted, for example, from a liquid crystal display unit. The manually operable keys of the manually operable inputting section 19 include a reproduction key, a stopping key, an AMS (Automatic Music Sensor) key for selection of a program, a search key and so forth.

The recording and reproducing apparatus further includes a RAM (hereinafter referred to as TOC memory) 21 for storing therein TOC (Table of Contents) information for linking addresses and segments of programs on the magneto-optical disk 1. Either at the point of time when the magneto-optical disk 1 is loaded in position or immediately before a recording or reproducing operation, the system controller 11 activates the spindle motor 2 and the optical head 3 so as to extract data of a TOC area which is set, for example, on the innermost circumference side of the magneto-optical disk 1. Then, the TOC information thus extracted is supplied by way of the RF amplifier 7 and the encoder/decoder section 8 to the system controller 11, at which it is subsequently stored into the TOC memory 21 so that it can thereafter be used for control of a recording and/or reproducing operation onto and/or from the magneto-optical disk 1.

In this manner, in a recordable disk medium, segment management data for allowing a program to be recorded onto and/or reproduced from a segment or a plurality of divisional segments. In short, a recordable disk medium has a user TOC area whose contents are rewritten by recording or erasure of data for management of recording data areas. The user TOC area has, for example, such a data structure as illustrated in FIG. 2.

Figure 2:
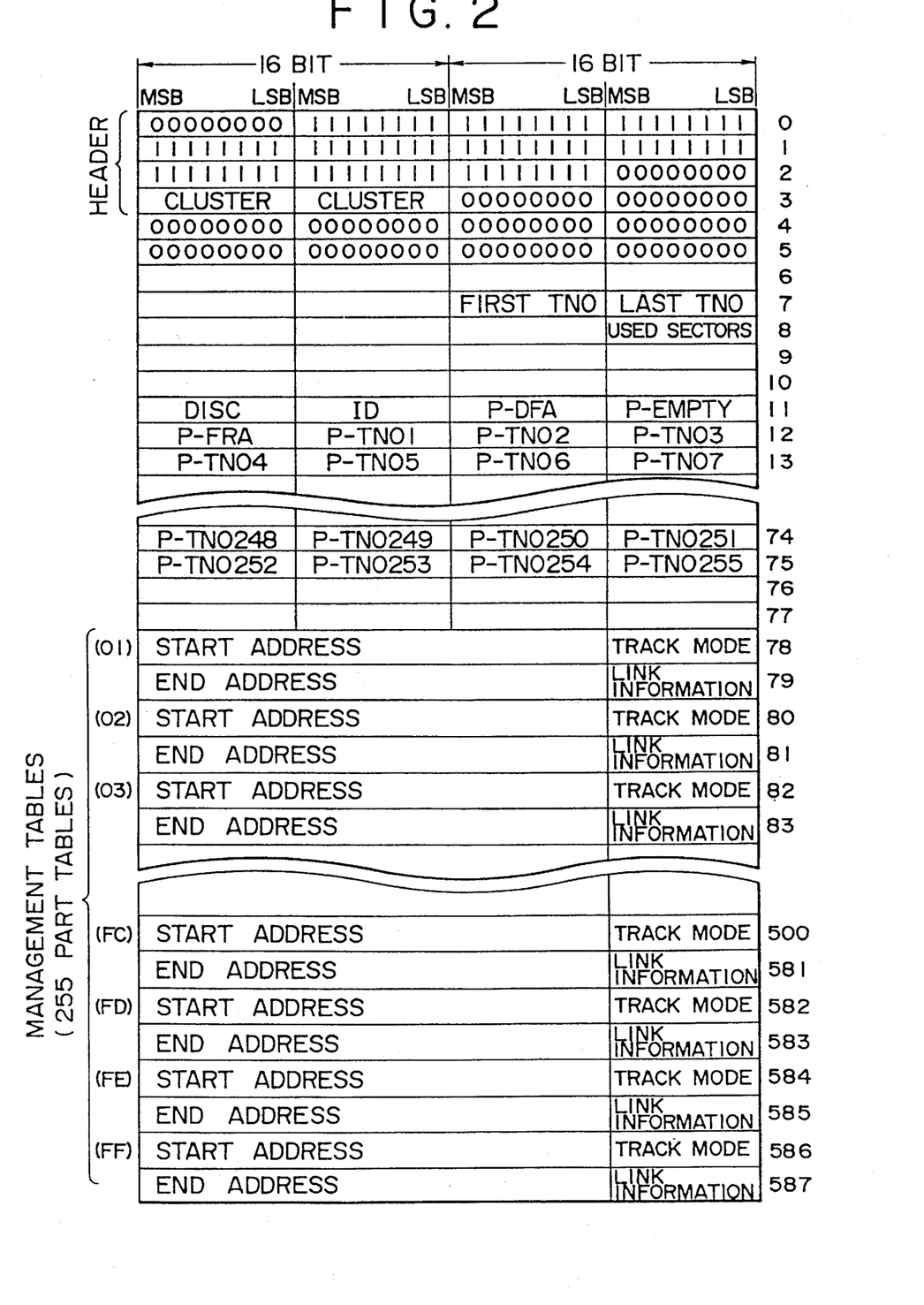
FIG. 2 is a table showing the structure of data of user TOC information to be read into the recording and/or reproducing apparatus of FIG. 1.

Referring to FIG. 2, the user TOC data area is constructed as 4 bytes×587 data areas, each of which has, at the head position thereof, a header having a synchronizing pattern formed from one byte data of all 0 or all 1.

Further, data of the program number (First TNO) of a first one of programs recorded on the magneto-optical disk, the program number (Last TNO) of a last program, a situation of use of sectors, a disk identification number (ID) and so forth are recorded at predetermined address positions of the magneto-optical disk. Further, areas into which various corresponding table indicating data (P-DFA to P-TNO255) which establish a corresponding relationship between the programs recorded on the magneto-optical disk and management tables which will be hereinafter described.

Meanwhile, a total of 255 part tables (01) to (FF) are provided as management tables, and a start address indicative of a starting point of a certain segment, an end address indicative of an end point of the segment, mode information of the segment (track), and, when the segment is subsequently linked to a different segment, link information indicative of a part table in which a start address and an end address of the different segment are recorded can be recorded into each of the part tables.

The mode information of a track includes information whether or not the track is set, for example, to overwrite inhibition or data reproduction inhibition, information whether or not information recorded on the track is audio information, information of distinction between monaural and stereo, and so forth. The link information designates a part table to be linked by the number (01) to (FF) allocated to the part table.

In short, one part table of the management tables represents one segment, and in the case of a program which is constituted, for example, from three segments linked to each other, the management of the positions of the segments is performed based on three part tables which are linked to each other by link information of them. It is to be noted that the numbers (01) to (FF) of the part tables can be used as they are as segment numbers.

Contents of segments of each of the part tables (01) to (FF) of the management tables are indicated by corresponding table indicating data (P-DFA to P-TNO255).

The corresponding table indicating data P-DFA indicate data regarding a defective area or areas on the magneto-optical disk 1 and designate a part table or a head one of a plurality of part tables which makes or make a defective area or areas by damage or by some other cause. In short, when a defective segment is present on the disk, one of the numbers (01) to (FF) corresponding to it is indicated by the corresponding table indicating data P-DFA, and in a part table of the number, the defective segment is indicated by start and end addresses thereof. Further, when some other defective segments are present, another part table corresponding to a first one of them is designated by the link information in the part table for the first defective segment, and a further defective segment is indicated in the part table for the second defective segment. Then, when there is no any other defective segment present, the link information represents, for example, "(00)", which indicates that there is no segment to be linked there.

Data P-EMPTY represent a part table or a first one of a plurality of part tables of the management tables which have not been used as yet. When an unused part table is present, one of the numbers (00) to (FF) is recorded as the corresponding table indicating data P-EMPTY. When a plurality of unused part tables are present, the part tables are designated successively by the link information beginning with a part table designated by the corresponding table indicating data P-EMPTY so that all of the unused part tables are linked on the management tables.

For example, when the magneto-optical disk has no information recorded thereon and has no defect thereon, since no part table is used, for example, the part table (01) is designated by the corresponding table indicating data P-EMPTY; the part table (02) is designated by the link information of the part table (01); the part table (03) is designated by the link information of the part table (02); and all of the part tables up to the part table (FF) are linked in this manner. In this instance, the link information of the part table (FF) is set to "(00)" which represents that there is no part table to be linked there.

Data P-FRA indicate data for a non-recorded data area or areas (including an erased area or areas) on the magneto-optical disk 1 and designate a part table or a first one of a plurality of part tables in which a segment as a non-recorded area is present. In short, when an unused recording area is present, one of the numbers (01) to (FF) is recorded in the corresponding table indicating data P-FRA, and a segment which is a non-recorded area is indicated by start and end addresses in a part table corresponding to the number of the unused recording area. Further, when a plurality of such segments are present, in short, when a plurality of part tables are present, the part tables are designated successively up to the part table whose link information is "(00)" in a similar manner.

Figure 3:
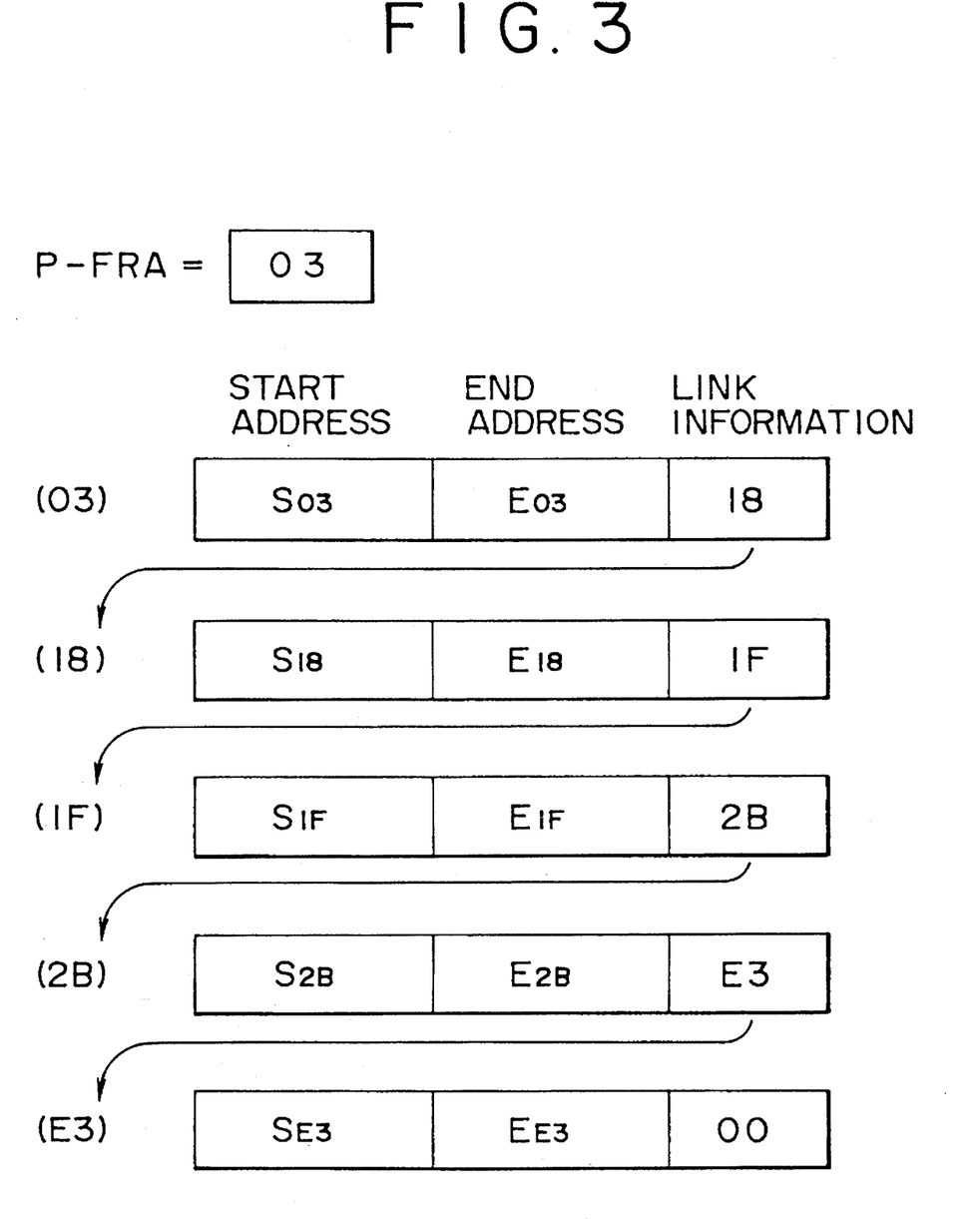
FIG. 3 is a diagrammatic view illustrating a form of management of segments by corresponding table indicating data and a part table in the recording and/or reproducing apparatus of FIG. 1.

FIG. 3 diagrammatically illustrates a form of management of segments as unused recording areas based on the part tables. Referring to FIG. 3, when the segments (03), (18), (1F), (2B) and (E3) are unused areas, the data (03) are recorded in the data P-FRA. Thus, the condition of the unused recording areas is represented by a link of the part tables (03), (18), (1F), (2B) and (E3) following the corresponding table indicating data P-FRA. It is to be noted that also the form of management of defective areas or of unused part tables described above is similar to this.

The data P-TNO1 to P-TNO255 indicate data for programs recorded on the magneto-optical disk 1, and for example, the corresponding table indicating data P-TNO1 designate a part table in which a segment on which data of the first program are recorded or one of a plurality of segments, on which data of the first program are recorded, that is to appear first in time is indicated.

For example, when a first program is recorded on a continuous track, that is, on one segment of the magneto-optical disk, a recording area of the first program is recorded as start and end addresses of a part table indicated by the corresponding table indicating data P-TNO1.

Meanwhile, when a second program is recorded discretely on a plurality of segments of the disk, the segments are designated in order of time in order to indicate the recording positions of the program. In short, from a part table designated by the corresponding table indicating data P-TNO2, the other part tables are designated successively in order of time by the link information ending with the part table wherein the link information is "(00)" (in a similar form as in FIG. 3). Since all of the segments on which data constituting, for example, the second program are recorded are successively designated and recorded on the magneto-optical disk in this manner, upon reproduction of the second program or when overwriting into the areas of the second program is to be performed, it is possible to cause, using the user TOC data, the optical head 3 and the magnetic head 3 to access the areas of the second program to extract continuous musical information from the discrete segments or to perform recording using the recording areas efficiently.

The recording and reproducing apparatus of the present embodiment for a magneto-optical disk 1 on which such user TOC data are recorded not only performs management of the recording areas on the disk 1 using the user TOC data read in the TOC memory 21 to control a recording operation but also produces a sequence table (reproduction advancement data) using the user TOC data and controls a reproducing operation based on the sequence table (S table).

The operation of producing a sequence table, contents of the sequence table and a reproducing operation using the sequence table will be described.

Figure 4:
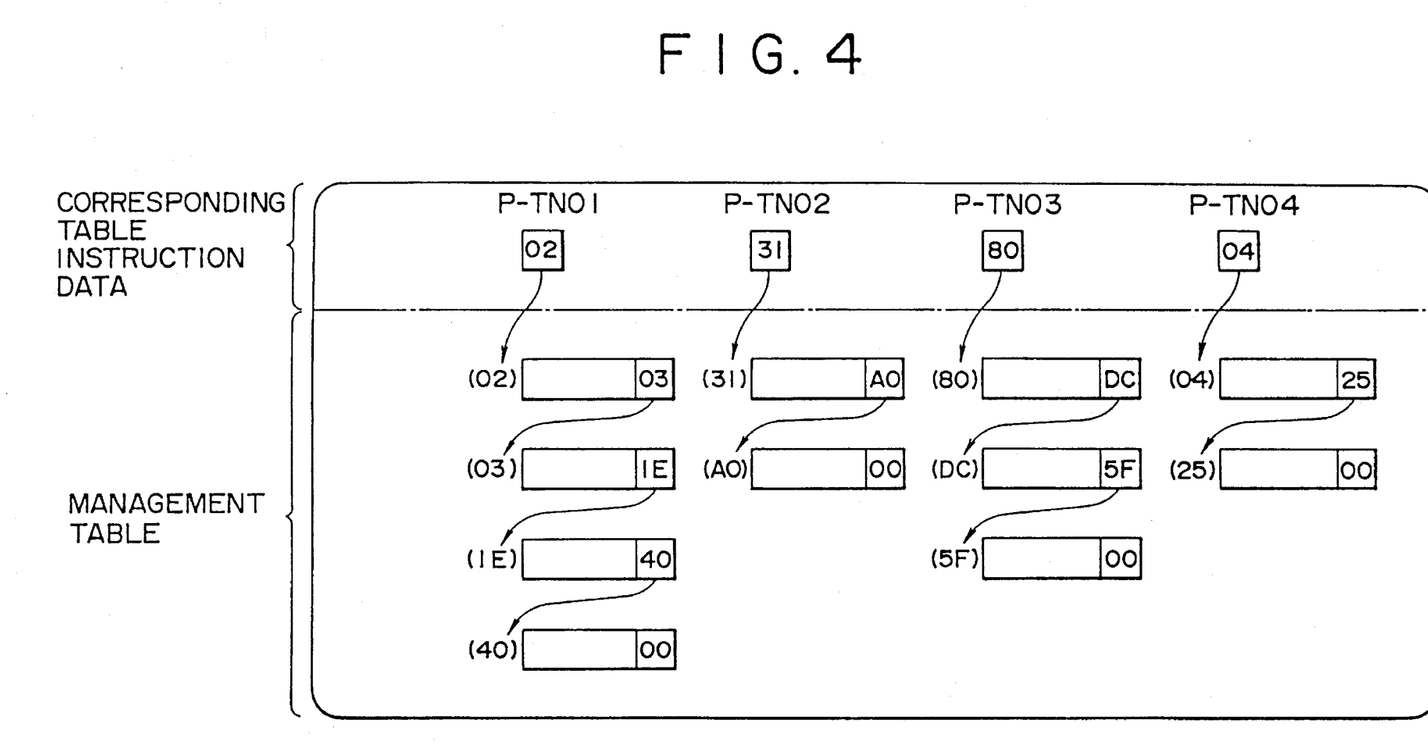
FIG. 4 is a diagrammatic view illustrating a form of management of segments of programs by corresponding table indicating data and a part table in the recording and/or reproducing apparatus of FIG. 1.

Now, it is assumed that a total of four programs having program numbers 01 to 04 are recorded on the magneto-optical disk 1 and segments are managed as seen from FIG. 4 based on the corresponding table indicating data P-TNO1 to P-TNO4 on the user TOC data and also on predetermined part tables in the management tables. In short, for example, the program 01 is recorded divisionally on four segments (02), (03), (1E) and (40), and the positions (start and end addresses) of the segments are indicated in the part tables (02), (03), (1E) and (40).

Figure 5:
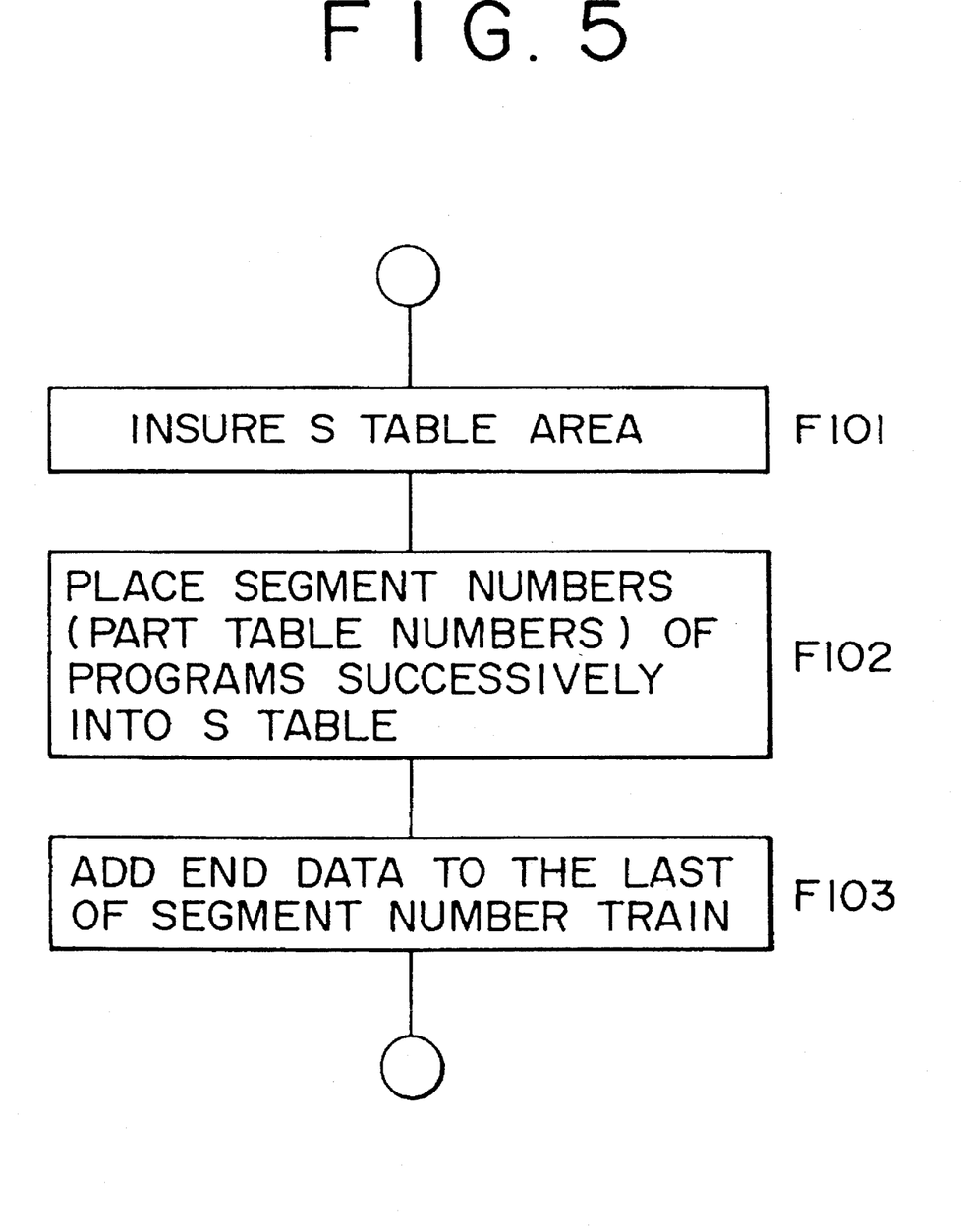
FIG. 5 is a flow chart illustrating an operation of producing a sequence table in the recording and/or reproducing apparatus of FIG. 1.
Figure 6A:
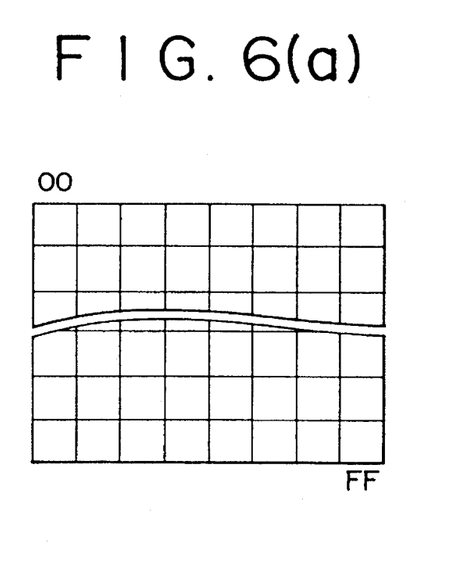
FIGS. 6(a) to 6(d) are diagrammatic views illustrating the sequence table producing operation illustrated in FIG. 5.

FIG. 5 illustrates an operation of producing a sequence table, and in FIG. 5, different steps are denoted at F101 to F103. Referring to FIG. 5, after the magneto-optical disk 1 is loaded in position, the TOC information is read in as described above, and accordingly, also the user TOC data illustrated in FIG. 2 are stored into the TOC memory 21. Thus, the system controller 11 produces a sequence table at a required point of time based on the user TOC data. First, a sequence table area 11As is insured in the work RAM 11A (step F101). In particular, for example, an area of 256 bytes is set as seen in FIG. 6(a).

Figure 6B:
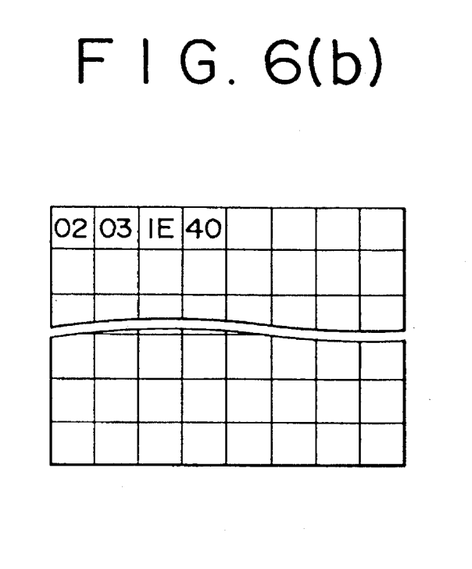
Figure 6C:
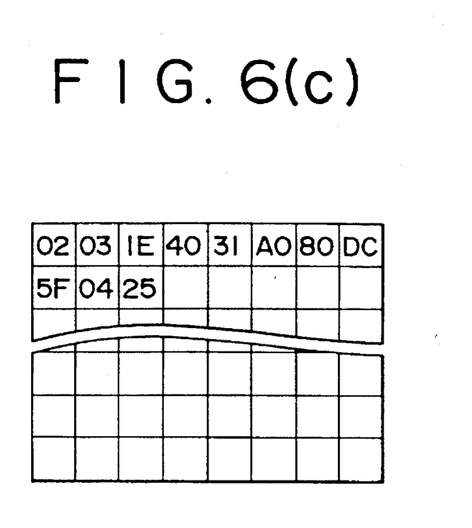

Subsequently, segment numbers, that is, part table numbers, managed as illustrated in FIG. 4 on the user TOC information, are successively stored into the thus set sequence table area 11As of the work RAM 11A beginning with the first program to the last program (step F102). FIG. 6(b) shows a condition wherein the segment number of the first program is set, and FIG. 6(c) shows another condition wherein the segment numbers of all of the programs are set completely.

Figure 6D:
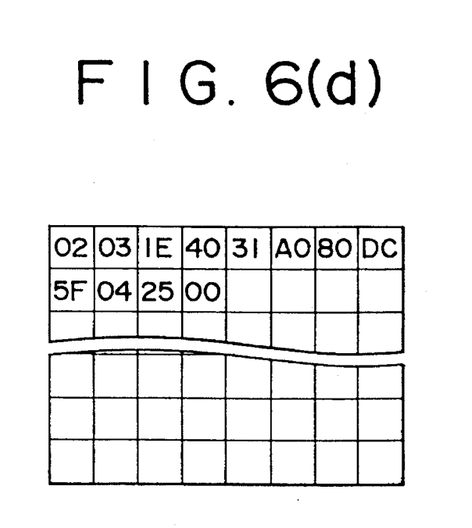

Finally, for example, data (00) are added as end data to the last of the segment number train as seen from FIG. 6(d) (step F103). Production of the sequence table is completed with this. It is to be noted that, instead of the addition of the end data, an address (address on the sequence table) of the position at which a segment number has been set finally may be stored.

A reproducing operation which is executed and controlled by the system controller 11 using the sequence table thus produced will be described subsequently with reference to FIGS. 7 to 12(a) and 12(b). In the flow charts of FIGS. 7 to 9, different steps are denoted by step numbers F200 to F240. Further, it is assumed that, as a reproducing operation, queue reproduction (fast feeding) and review reproduction (fast reverse feeding) can be executed in addition to ordinary reproduction.

Figure 10A:
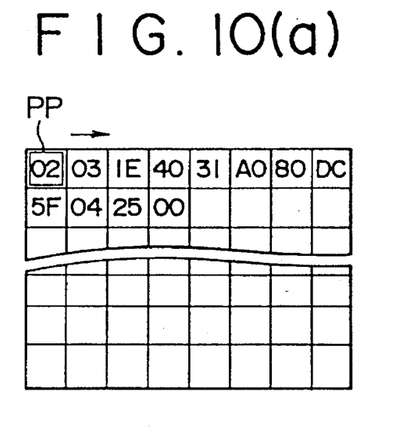
FIGS. 10(a) and 10(b) are diagrammatic views illustrating an operation of referring to the sequence table in the recording and/or reproducing apparatus of FIG. 1 upon reproduction.

If, for example, a user enters an instruction of an ordinary reproducing operation beginning with a first program by way of the manually operable inputting section 19, then a reproduction pointer PP is set to a head position on the sequence table as seen from FIG. 10(a) (step F201). It is to be noted that, if a reproducing operation is performed otherwise beginning, for example, with a third program, then the reproduction pointer PP is naturally set to (80) on the sequence table. Then, an address of a segment is grasped from a part table indicated by the pointer PP, and a reproducing operation is started.

Figure 10B:
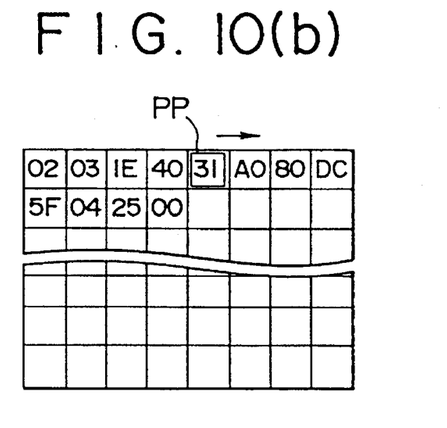
Figure 11A:
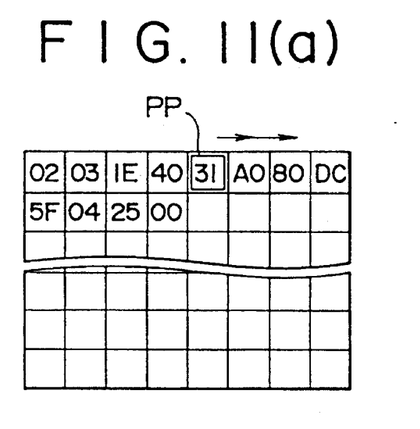
FIGS. 11(a) and 11(b) are diagrammatic views illustrating another operation of referring to the sequence table in the recording and/or reproducing apparatus of FIG. 1 upon queue reproduction.
Figure 11B:
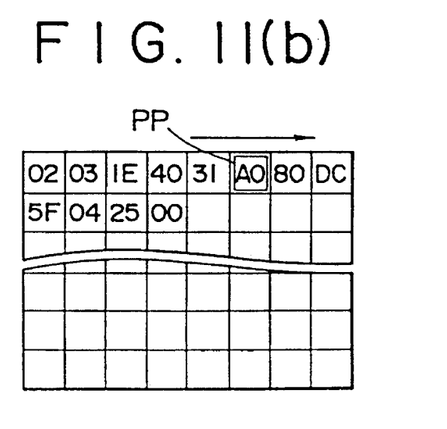
Figure 12A:
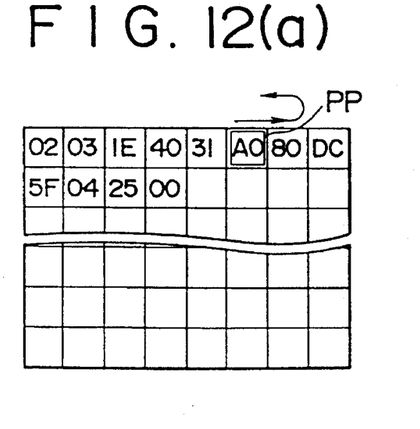
FIGS. 12(a) and 12(b) are diagrammatic views illustrating a further operation of referring to the sequence table in the recording and/or reproducing apparatus of FIG. 1 upon review reproduction.
Figure 12B:
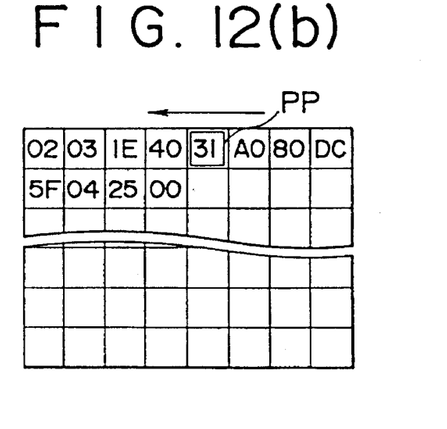

Thus, reproduction of the segment indicated by the reproduction pointer PP proceeds (step F203), and when reproduction of the segment comes to an end, the reproduction pointer PP is advanced by one step (steps F207 to F208), whereafter reproduction of a segment indicated by the new value of the reproduction pointer PP is executed. In short, in a reproducing operation, the part tables are successively retrieved based on the segment numbers (03)→(1E)→(40)→(31) . . . designated successively by the reproduction pointer PP on the sequence table, and the addresses of the segments are grasped to access the segments to execute reading of data from the segments (step F203). FIG. 10(b) shows a condition wherein the reproduction pointer PP advances to the position at which it designates the segment (31) and a first segment for the second program is being reproduced at present.

Figure 7:
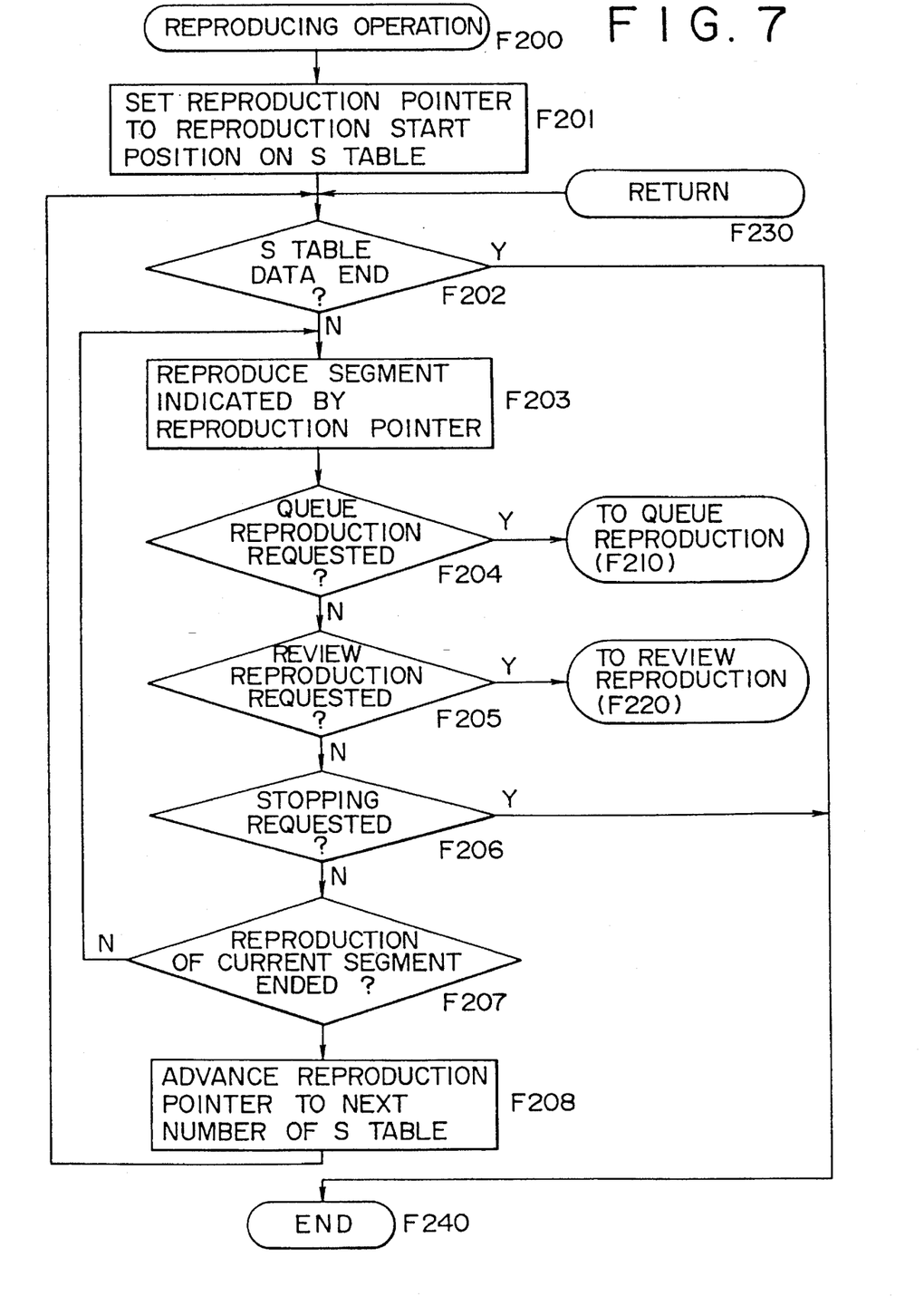
FIG. 7 is a flow chart illustrating operation of the recording and/or reproducing apparatus of FIG. 1 upon reproduction.

If reproduction proceeds in this condition until the reproduction pointer PP advances to the position of (00), then since this signifies that reproduction of the programs has completed, the reproducing operation is ended (steps F202 to F240).

On the other hand, also when a stopping instruction is inputted by the user, the reproducing operation is stopped (steps F206 to F240).

Figure 8:
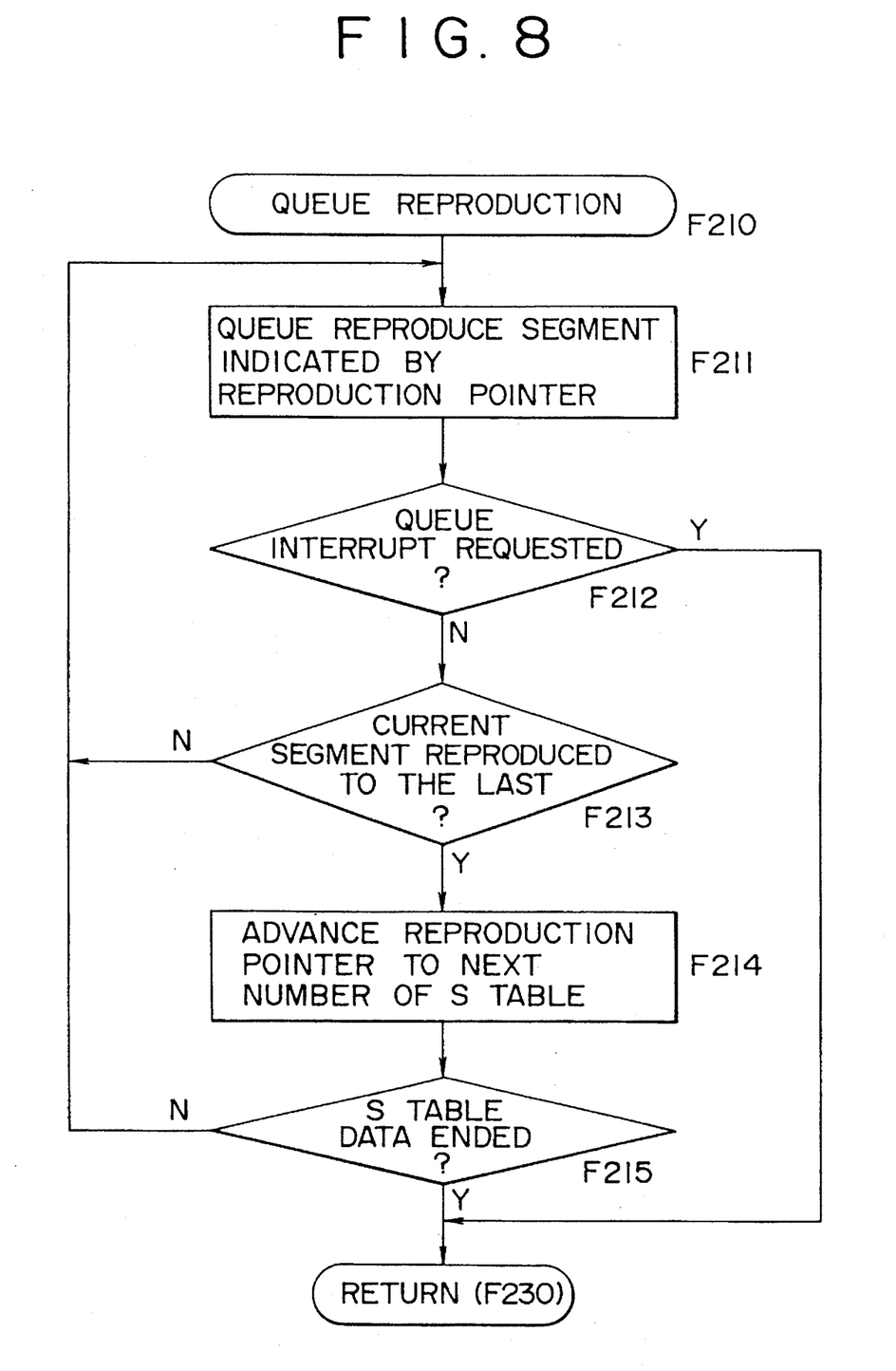
FIG. 8 is a flow chart illustrating operation of the recording and/or reproducing apparatus of FIG. 1 upon queue reproduction.
Figure 9:
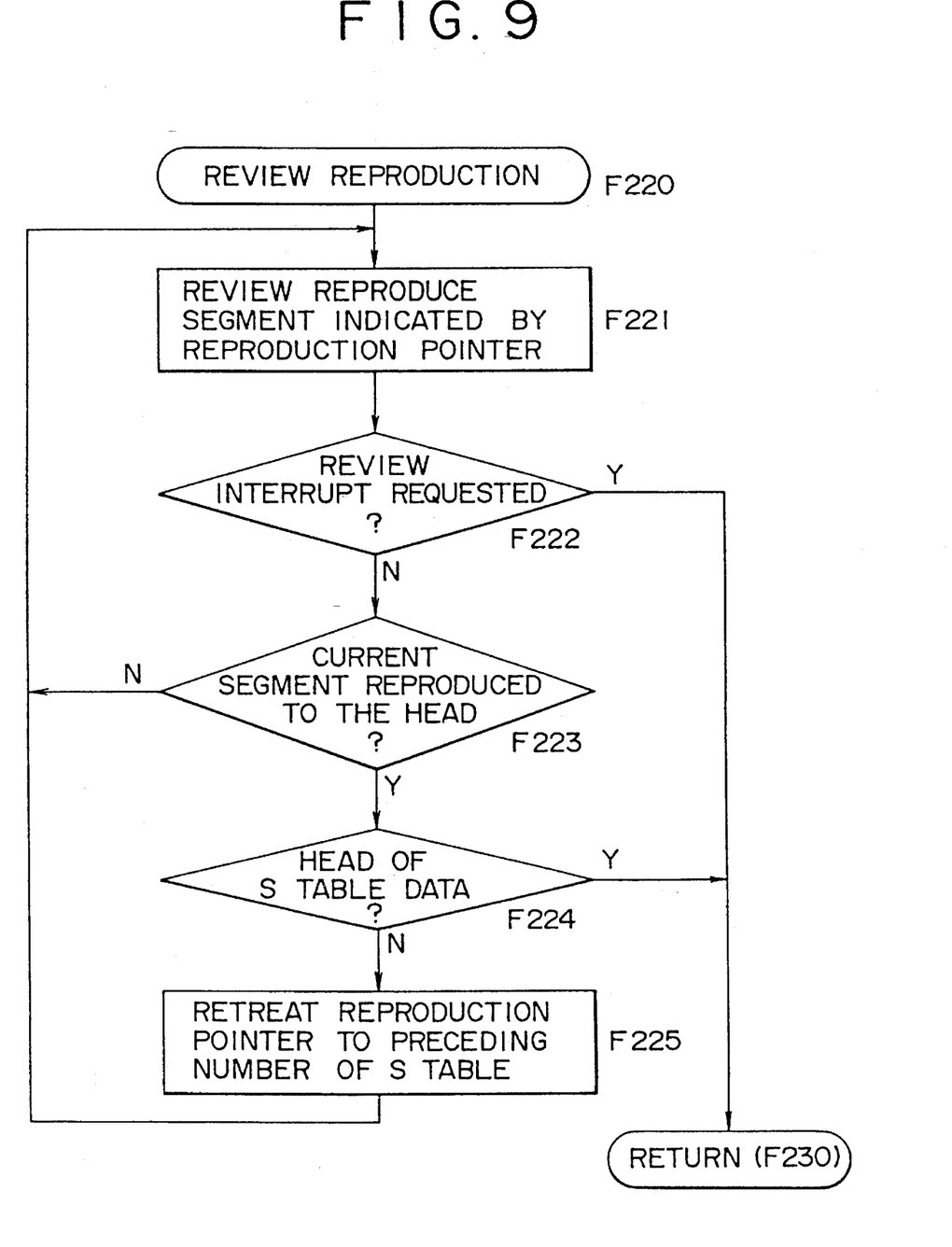
FIG. 9 is a flow chart illustrating operation of the recording and/or reproducing apparatus of FIG. 1 upon review reproduction.

However, otherwise if an operation for queue (fast feeding) reproduction or for review (fast reverse feeding) reproduction is performed during the reproducing operation by the user (step F204 or F205), then the process advances to step F210 of FIG. 8 or to step F220 of FIG. 9, respectively.

In the case of a queue reproducing operation, queue reproduction is performed in a segment indicated by the reproduction pointer PP. That is, a reproducing operation is performed while performing track jumping in a forward direction in time (step F211). Queue reproduction in a single segment is disclosed, for example, in U.S. Pat. No. 4,613,967. Then, when the reproduction of the segment comes to an end, the reproduction pointer PP is advanced by one step as seen from FIGS. 11(a) and 11(b), and then queue reproduction of a segment designated by the new value of the reproduction pointer PP is performed (steps F213, F214, F215 and F211). At a point of time when an interrupting operation of the queue reproduction is inputted (step F212) or at another point of time when the reproduction pointer PP reaches the last end of the sequence table (step F215), the process returns from step F230 of FIG. 7 to ordinary reproduction processing and continues or ends the reproduction.

On the other hand, in the case of a review reproducing operation, review reproduction is performed beginning with a segment indicated by the reproduction pointer PP at present, that is, a reproducing operation is performed while performing track jumping in the reverse direction in time (step F221). Then, when the segment comes to an end, that is, when a track at the head address of the segment is reached, the reproduction pointer PP is retreated by one, for example, as seen from FIGS. 12(a) and 12(b) (step F225). Then, an end address of a segment designated by the new value of the reproduction pointer PP is read out referring to the part table, and accessing to a track having the address is performed to continue the review reproduction of the segment (steps F223, F224, F225 and F221). At a point of time when an interrupting operation of the review reproduction is inputted (step F222) or at another point of time when the review reproduction of a segment at the head position of the sequence table is completed (step F224), the process returns from step F230 of FIG. 7 to ordinary reproduction processing.

In short, in the present embodiment, since the segment to be reproduced is successively designated by advancing or retreating the reproduction pointer PP on the sequence table, it is possible to follow discrete segments even in the reverse direction in time, and accordingly, it is possible to perform review reproduction readily.

By the way, when the memory for storing the sequence table therein has a sufficient memory capacity, data other than segment numbers may be stored in the sequence table.

Figure 13:
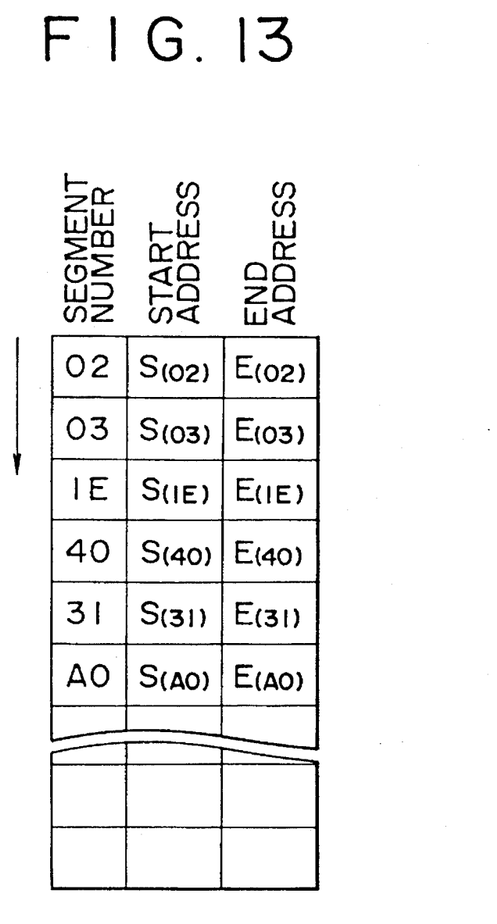
FIG. 13 is a diagrammatic view illustrating another form of the sequence table in the recording and/or reproducing apparatus of FIG. 1.

For example, if the sequence table is produced otherwise such that, as shown in FIG. 13, start addresses and end addresses are stored in addition to segment numbers, then after the reproduction of such sequence table, the sequence table allows a reproducing or a special reproducing operation to be performed as described above without referring to data of the TOC memory 21 (that is, the address information recorded in the part table) at all.

Figure 14:
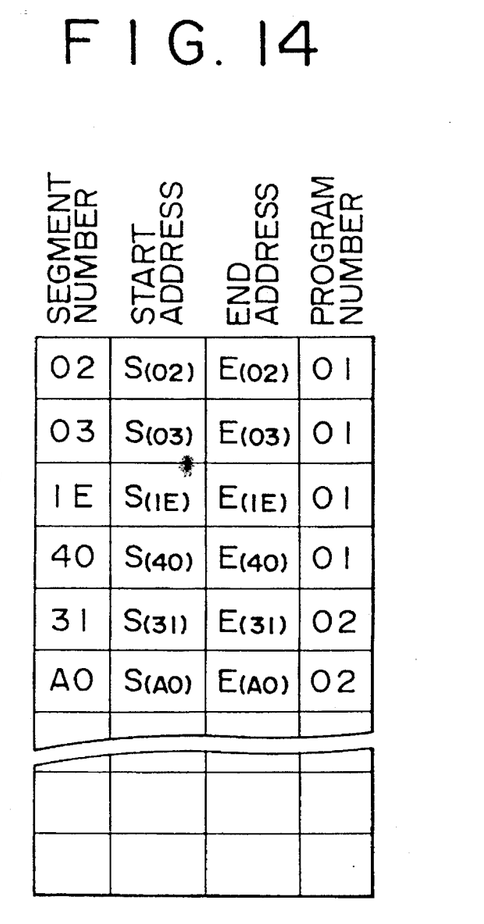
FIG. 14 is a similar view but illustrating a further form of the sequence table in the reproducing and/or reproducing apparatus of FIG. 1.

Further, if the sequence table is produced otherwise such that, as shown in FIG. 14, program numbers are stored in addition to segment numbers, start addresses and end addresses, then it is possible, upon programmed reproduction wherein programs are reproduced in order designated by the user, to follow the order of the program reversely to perform review reproduction, and further, if, upon shuffle reproduction wherein programs are reproduced in random order, the reproduction order is stored by the system controller, then it is possible to follow the order reversely to perform review reproduction.

It is to be noted that, in the case of programmed reproduction, if a sequence table is produced, as designation by the user of the order of programs proceeds, in order of the programs, then it is possible to perform queue and/or review reproduction in accordance with the order without addition of program numbers.

It is also to be noted that, since the user TOC data are successively rewritten every time a recording operation or an erasing operation of data is performed, production of a sequence table must necessarily be performed before a reproducing operation after at least the user TOC data are rewritten. For example, a sequence table may be produced every time, for example, a reproducing operation is performed.

Although in the embodiment described above, a sequence table is produced at a stage before a reproducing operation, it may otherwise be produced by successively recording segments passed as a reproducing operation proceeds. In this instance, whichever review reproduction of programmed reproduction, shuffle reproduction, repeat reproduction and jumping reproduction based on an AMS operation is instructed, review reproduction wherein the order of reproduction is followed up reversely with fidelity can be realized.

Furthermore, it may be possible to add delineation data between a delineating portion between two programs in the sequence table or to provide, in addition to the sequence table, another table which indicates the positions of head segment numbers of the programs on the sequence table. Each of the modifications can promote diversification of reproduction and reverse reproduction.

It is to be noted that, while the present invention is applied, in the embodiment described above, to a recording and reproducing apparatus, naturally the present invention may be applied to an apparatus for exclusive use for reproduction. Further, the present invention can be applied to reproducing apparatus which cope not only with a magneto-optical disk but also with any other optical disk.

Having now fully described the invention, it will be apparent to one of ordinary skill in the art that many changes and modifications can be made thereto without departing from the spirit and scope of the invention as set forth herein.

What is claimed is:

1. A reproducing apparatus for reproducing a program recorded on a program segment or segments from a recording medium which has recorded thereon segment management data including a plurality of part tables, wherein a first part table has a start address and an end address of a first program segment and link information indicative of a second part table in which a start address and an end address of a second program segment to be linked to the end address of the first segment, and corresponding data indicating a stored position of one of the plurality of part tables of the management data for each of the recorded program segments, comprising:

data read-out means for reading out data from the recording medium;

means for producing reproduction advancement data from the segment management data read out by said data read-out means, the reproduction advancement data being produced by rearranging the segment management data according to the link information contained in the part tables, the rearranged segment management data including segment numbers indicated in order of reproduction, so that the segments can be accessed successively in the forward or reverse reproducing direction;

control means for controlling an ordinary reproducing operation or an irregular reproducing operation, such as queue reproduction and review reproduction, based on the reproduction advancement data; and storage means for storing the produced reproduction advancement data.

2. The reproducing apparatus of claim 1, wherein the reproduction advancement data are produced such that start addresses and end addresses of the program segments are indicated in order of reproduction so that the program segments can be accessed successively in the forward or reverse reproducing direction without referring to the segment management data.

3. The reproducing apparatus of claim 1, wherein the reproduction advancement data are produced such that program segment numbers and/or start addresses and end addresses of the program segments are indicated in order of reproduction and the numbers of the programs to which the program segments belong are indicated so that the program segments can be accessed in a desired order of programs in the forward or reverse reproducing direction.

4. The reproducing apparatus of claim 1, wherein the storage means stores the reproduction advancement data in a sequence table area thereof, and the control means reads out a program segment number in response to a reproduction pointer, and further, wherein the reproduction pointer moves through the sequence table stored in said storage means, and the control means reproduces a program segment in accordance with the segment number read out.

5. The reproducing apparatus of claim 4, wherein the sequence table is produced during a reproducing operation.

* * * * *